US011143225B2

(12) United States Patent
Tseng et al.

(10) Patent No.: US 11,143,225 B2
(45) Date of Patent: Oct. 12, 2021

(54) CONNECTING STRUCTURE FOR ASSEMBLY AND ASSEMBLED APPARATUS USING THE SAME

(71) Applicants: Ju-Chiung Tseng, New Taipei (TW); Yi-Sheng Tseng, New Taipei (TW); Yi-Hung Tseng, New Taipei (TW)

(72) Inventors: Ju-Chiung Tseng, New Taipei (TW); Yi-Sheng Tseng, New Taipei (TW); Yi-Hung Tseng, New Taipei (TW)

( * ) Notice: Subject to any disclaimer, the term of this patent is extended or adjusted under 35 U.S.C. 154(b) by 315 days.

(21) Appl. No.: 16/352,819

(22) Filed: Mar. 14, 2019

(65) Prior Publication Data
US 2020/0291975 A1   Sep. 17, 2020

(51) Int. Cl.
*F16B 12/20*   (2006.01)

(52) U.S. Cl.
CPC ...... *F16B 12/2009* (2013.01); *A47B 2230/07* (2013.01)

(58) Field of Classification Search
CPC ............ A47B 47/0066; A47B 47/0075; A47B 47/042; A47B 2230/07; F16B 5/0208; F16B 5/0614; F16B 12/12; F16B 12/20; F16B 12/2009; F16B 12/2027; F16B 12/2036; F16B 12/2054; F16B 12/2063; Y10T 403/4602; Y10T 403/553; Y10T 403/556; Y10T 403/7096; Y10T 403/73
USPC .................. 403/DIG. 10, DIG. 12, DIG. 13
See application file for complete search history.

(56) References Cited

U.S. PATENT DOCUMENTS

| 3,730,568 | A | * | 5/1973 | Giovannetti | F16B 21/16 403/245 |
| 4,047,822 | A | * | 9/1977 | Lehmann | F16B 5/0092 403/187 |
| 4,131,376 | A | * | 12/1978 | Busse | F16B 12/2036 312/263 |
| 4,353,663 | A | * | 10/1982 | Glickman | F16B 12/20 403/230 |

(Continued)

FOREIGN PATENT DOCUMENTS

| EP | 1008767 A1 | * | 6/2000 | .......... F16B 12/2036 |
| EP | 2487373 A1 | * | 8/2012 | .......... F16B 12/2063 |

(Continued)

OTHER PUBLICATIONS

Office Action dated Sep. 4, 2018 of the corresponding Taiwan patent application.

*Primary Examiner* — Josh Skroupa
*Assistant Examiner* — Kevin J Baynes
(74) *Attorney, Agent, or Firm* — Chun-Ming Shih; HDLS IPR Services

(57) ABSTRACT

A connecting structure for assembly includes a body, an inserting part, a latching part, and a control part. The body has a plug hole and a guide slot disposed toward the plug hole. The inserting part is detachably plugged into the plug hole correspondingly and has a latching portion. The latching part is slidely connected to and guided by the guide slot; the latching part has a latching body latched to the latching portion correspondingly. The control part is disposed movably in the body and selectively drives the latching part to reciprocate along the guide slot. Therefore, the esthetic effects of covering and hiding each other for assembled plates and the effect of a smooth, labor-saving, and even rotation for the control part are obtained.

12 Claims, 8 Drawing Sheets

(56) References Cited

U.S. PATENT DOCUMENTS

| | | | | |
|---|---|---|---|---|
| 4,585,365 A * | 4/1986 | Manno | ................... | F16B 12/20 108/153.1 |
| 4,634,309 A * | 1/1987 | Dewey | ................... | F16B 12/24 403/231 |
| 5,567,081 A * | 10/1996 | Vallance | ............. | F16B 12/2036 403/231 |
| 5,590,975 A * | 1/1997 | Horntvedt | ........... | F16B 12/2036 312/348.2 |
| 5,807,013 A * | 9/1998 | Brustle | ............... | F16B 12/2009 403/245 |
| 5,810,505 A * | 9/1998 | Henriott | ................. | F16B 12/14 108/153.1 |
| 5,823,700 A * | 10/1998 | Poworoznek | ....... | F16B 12/2036 403/245 |
| 6,257,796 B1 * | 7/2001 | Salice | ................ | F16B 12/2027 403/231 |
| 6,547,477 B1 * | 4/2003 | Huber | ................ | F16B 12/2009 403/231 |
| 6,908,252 B1 * | 6/2005 | Rubano | .............. | F16B 12/2027 403/231 |
| 2005/0042027 A1 * | 2/2005 | Migli | ................. | F16B 12/2009 403/409.1 |
| 2007/0169430 A1 * | 7/2007 | Hutchens | ............ | F16B 12/2009 52/584.1 |
| 2009/0123222 A1 * | 5/2009 | Ho | ...................... | F16B 12/2009 403/81 |
| 2009/0206613 A1 * | 8/2009 | Hawang | ................. | E05C 3/047 292/57 |
| 2019/0309777 A1 * | 10/2019 | Cattaneo | ............ | F16B 12/2063 |

FOREIGN PATENT DOCUMENTS

| | | | | |
|---|---|---|---|---|
| FR | 2575794 | A1 | 7/1986 | |
| GB | 2167825 | A * | 6/1986 | ......... F16B 12/2036 |

* cited by examiner

CONNECTING STRUCTURE FOR ASSEMBLY AND ASSEMBLED APPARATUS USING THE SAME

BACKGROUND OF THE INVENTION

Field of the Invention

The present invention relates to a connection between two adjacent plates and in particular to a connecting structure for assembly and an assembled apparatus using the same.

Description of Prior Art

As for the connection between two adjacent plates of a cabinet or a case (for example, the joining plane of a vertical plate is joined to the joining side of a transversely placed plate through a connecting structure), a traditional connection uses nails which damage the surfaces of the plates. Thus, an additional process for esthetic appearance is required and becomes time-consuming, complicated and expensive.

The current connecting structure abandons the traditional nailed connection; thus, the plate surface will not be damaged and the additional process for esthetic appearance is not required. The current connecting structure comprises the cam lock nut and cam screw; an opening and a plug hole which are communicated with each other are formed on the surface and the joining side of the transversely placed plate, respectively; a throughhole is formed on the joining plane of the vertical plate.

One end of the cam screw is fixed to the throughhole of the vertical plate; the other end of the cam screw has a lock head. The cam lock nut which has a lock groove and an operating portion is embedded in the opening of the transversely placed plate; the operating portion is exposed on the surface of the transversely placed plate.

The connection process is described as follows. The other end of the cam screw is inserted in the plug hole of the transversely placed plate such that the lock head penetrates into the lock groove. Then, a hand tool is applied to rotate the operating portion such that the cam lock nut rotates with respect to the transversely placed plate and the lock head is latched by the rotated lock groove, incapable being separated. As a result, the vertical plate can be joined to the transversely placed plate without nails.

However, three holes in total have to be drilled on these tow plates for the current connecting structure; that is, the above-mentioned opening, plug hole, and throughhole. Only the plug hole and the throughhole are covered and hidden after the two plates are closed joined; the opening will be entirely exposed outside to affect esthetic appearance.

Additionally, in the current connecting structure, the rotation of the cam lock nut is done in the opening of the plate in which the cam lock nut is embedded and the uneven inner wall of the opening is immediately adjacent to the cam lock nut, which results in difficulty in rotating the cam lock nut when a hand tool is used to operate. Sometimes the cam lock nut is just stuck in an uneven position in the opening and cannot be rotated.

SUMMARY OF THE INVENTION

The object of the present invention is to provide a connecting structure for assembly and an assembled apparatus using the same, which can cover and hide the holes formed in two plates after assembly of the two plates and have the effect of a smooth, labor-saving, and even rotation for the control part to control and release the latching state without being stuck.

To achieve the above objective, the present invention provides a connecting structure for assembly, which comprises a body, an inserting part, a latching part, and a control part. The body has a plug hole and a guide slot disposed toward and leading to the plug hole. The inserting part is detachably plugged into the plug hole correspondingly and has a latching portion. The latching part is slidely connected to and guided by the guide slot; the latching part has a latching body latched to the latching portion correspondingly. The control part is disposed movably in the body and selectively drives the latching part to reciprocate along the guide slot. When the control part drives the latching part to slide toward the plug hole, the latching body is latched to the latching portion correspondingly; when the control part drives the latching part to slide far away from the plug hole, the latching body is separated from the latching portion to release the latching state.

The present invention also provides an assembled apparatus using the connecting structure for assembly, which comprises a first plate having a joining plane, a second plate having a joining side disposed adjacent to the joining plane, and a connecting structure.

The connecting structure comprises a body, an inserting part, a latching part, and a control part. The body is embedded in the joining plane and has a plug hole and a guide slot disposed toward and leading to the plug hole. The inserting part is fixed on the joining side, is detachably plugged into the plug hole correspondingly, and has a latching portion. The latching part is slidely connected to and guided by the guide slot; the latching part has a latching body latched to the latching portion correspondingly. The control part is disposed movably in the body and selectively drives the latching part to reciprocate along the guide slot.

When the control part drives the latching part to slide toward the plug hole, the latching body is latched to the latching portion correspondingly to join the second plate to the first plate; when the control part drives the latching part to slide far away from the plug hole, the latching body is separated from the latching portion to release the latching state.

Compared with the prior art, the present invention has the following effects. Only two holes are required for two plates to be assembled. The two holes can cover and hide each other after these two plates are assembled, which has the esthetic appearance. Also, the effect of a smooth and labor-saving rotation of the control part totally without being stuck can be obtained.

DETAILED DESCRIPTION OF THE INVENTION

Figure 1:
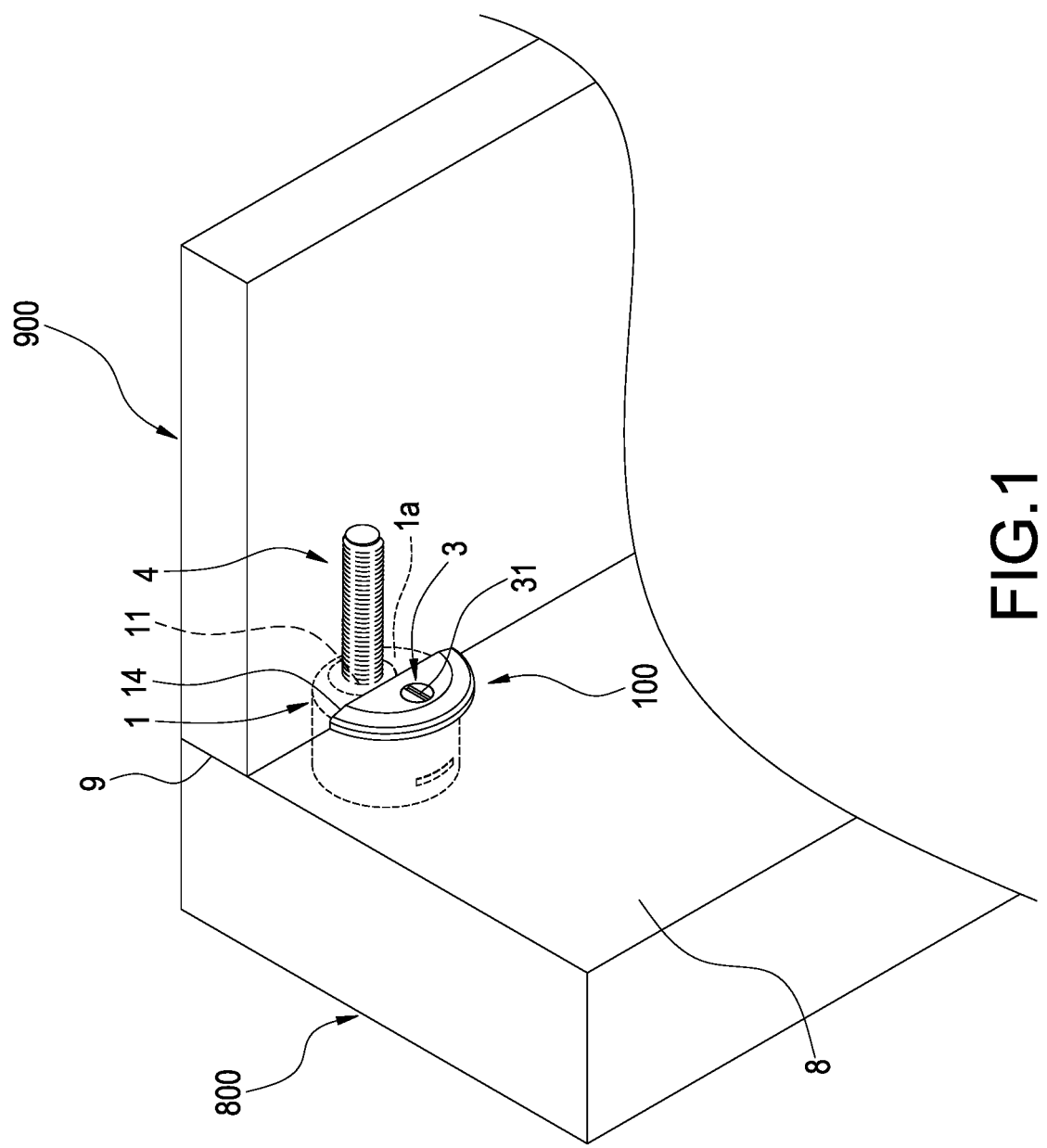
FIG. 1 is a perspective assembled view of the assembled apparatus of the present invention.

As shown in FIGS. 1-4, the present invention provides a connecting structure for assembly and an assembled apparatus using the connecting structure for assembly. The assembled apparatus comprises a first plate 800, a second plate 900, and at least one connecting structure 100 joined between the first plate 800 and the second plate 900. The connecting structure 100 comprises a body 1, a latching part 2, a control part 3, and an inserting part 4.

The body 1 may have any shape and a cylinder is used as an example as shown in FIGS. 1-4. The body 1 has a first end surface 1a and a second end surface 1b, both of which are opposite to each other. The body 1 also defines an axial direction D which is roughly perpendicular to the first end surface 1a and the second end surface 1b. A plug hole 11 and a shaft hole 13 are formed in the body 1 along the axial direction D; a plug opening 111 is formed in the plug hole 11 on the first end surface 1a; another opening (not labeled) is formed in the shaft hole 13 on the first end surface 1a. A guide slot 12 is formed radially in the body 1 toward and leading to the plug hole 11. Preferably, the guide slot 12 connects between the plug hole 11 and the shaft hole 13 such that the plug hole 11, the guide slot 12, and the shaft hole 13 together form a U-like shape. Also, the guide slot 12 communicates with and intersects with the plug hole 11 and the shaft hole 13.

The inserting part 4 may be any component having a function of insertion and connection; a rod body is used as an example as shown in FIGS. 1-4. The inserting part 4 has an end which is detachably plugged into the plug hole 11 and has a latching portion 41. The latching portion 41 may be any structure having a function of being latched; a neck portion formed at an end of the rod body is used as an example as shown in FIGS. 1-4.

The latching part 2 may be any component having a latching function; a tongue sheet is used as an example as shown in FIGS. 1-4. The latching part 2 is slidely connected to and guided by the guide slot 12; the latching part 2 has a latching body 21 latched to the latching portion 41 correspondingly. The latching body 21 may be any structure having a latching function. For example, the latching body 21 may be at least one projecting ear which is formed at an end of the tongue sheet and extends into and latches the neck portion correspondingly as shown in FIGS. 1-4. Preferably, the latching body 21 comprises two projecting ears disposed in parallel and a cut 211 is formed between these two projecting ears such that these two projecting ears can extend into and latch the neck portion correspondingly.

The control part 3 may be any component which has a control function and moves with respect to the body 1; as shown in FIGS. 1-4, a shaft is used as an example and is rotationally and axially connected in the shaft hole 13 to rotate. One end of the shaft is the driving end 32 which eccentrically drives the latching part 2 to reciprocate along the guide slot 12; the other end of the shaft is the control end 31 which is exposed out of the above-mentioned another opening to be controlled by the user. Therefore, the shaft can rotate clockwise or counterclockwise to drive the latching part 2 along the guide slot 12 to move toward or away from the plug hole 11. The so-called "axially connected" means the shaft and the shaft hole 13 are axially pivoted together such that the shaft can rotate around its own axis.

The driving end 32 of the control part 3 can drive the latching part 2 to slide using any kind of structure; for example, as shown in FIGS. 1-4, a protrusion 321 eccentrically projecting from the driving end 32. A latching slot 22 is formed on the latching part 2 at a corresponding position where the protrusion 321 can be inserted into the latching slot 22 such that the control part 3 can use the protrusion 321 to eccentrically drive the latching part 2 to slide back and forth.

The control end 31 of the control part 3 can be provided with a straight groove or a cross groove for the user to rotate the control part 3 with respect to the body 1 with a hand tool such as a slotted screwdriver or a Phillips head screwdriver.

One of the first plate 800 and the second plate 900 may be a vertical plate (e.g., the left plate or the right plate); the other may be a transversely placed plate (e.g., the top plate or the bottom plate). The joining side 9 of the second plate 900 is joined to the joining plane 8 of the first plate 800.

A buried hole 81 is formed on the joining plane 8; the body 1 is embedded and fixed in the buried hole 81 such that the first end surface 1a is exposed out of the buried hole 81, at most flush with the joining plane 8. Thus, the plug hole 11 and the control end 31 are both exposed out of the buried hole 81. The other end of the inserting part 4 is inserted in and fixed in the joining side 9 such that one end of the latching portion 41 protrudes from the joining side 9.

Figure 3:
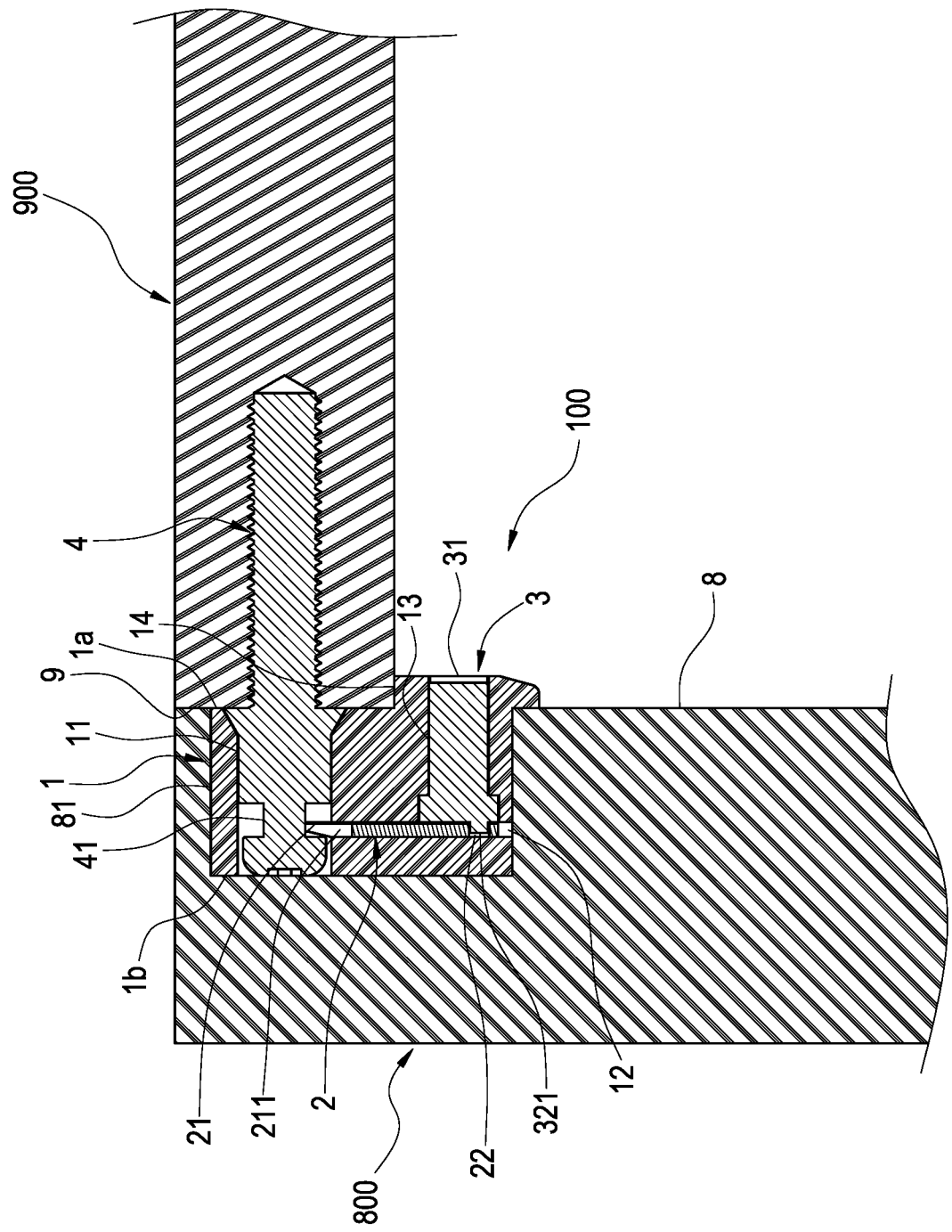
FIG. 3 is a cross-sectional view according to FIG. 1 before assembly.
Figure 4:
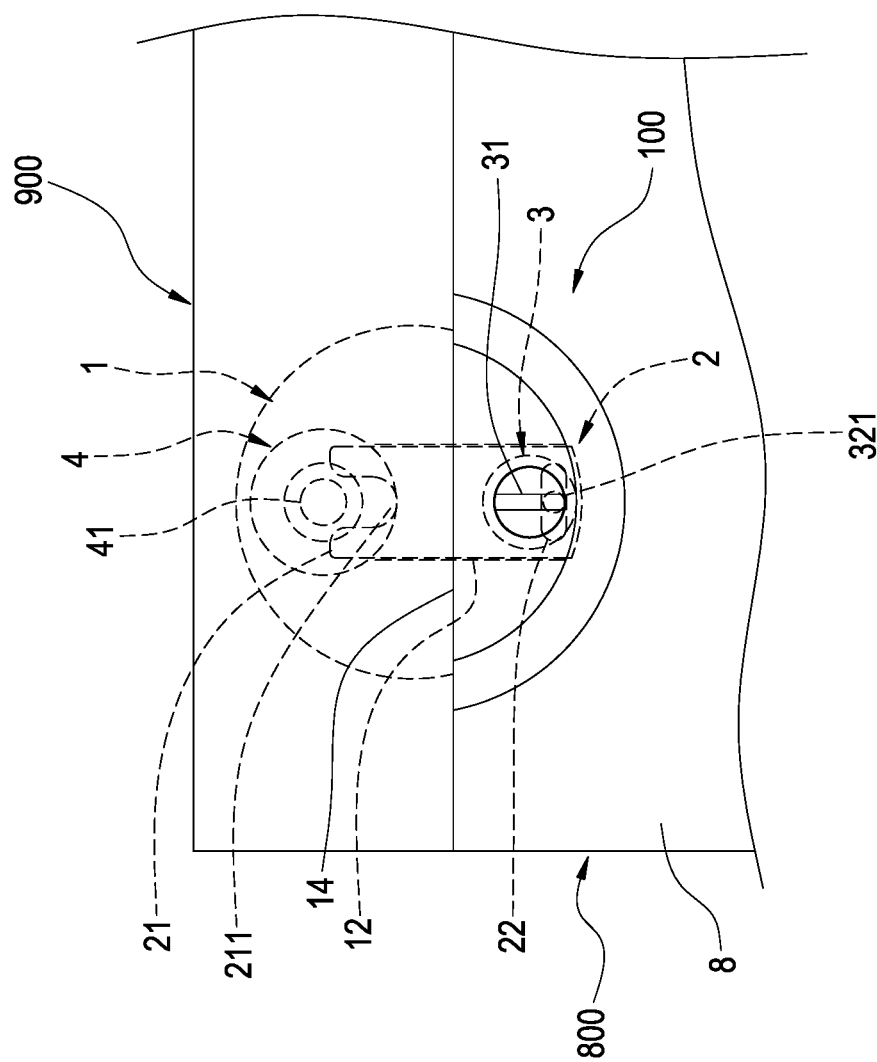
FIG. 4 is a top view according to FIG. 1 before assembly.
Figure 5:
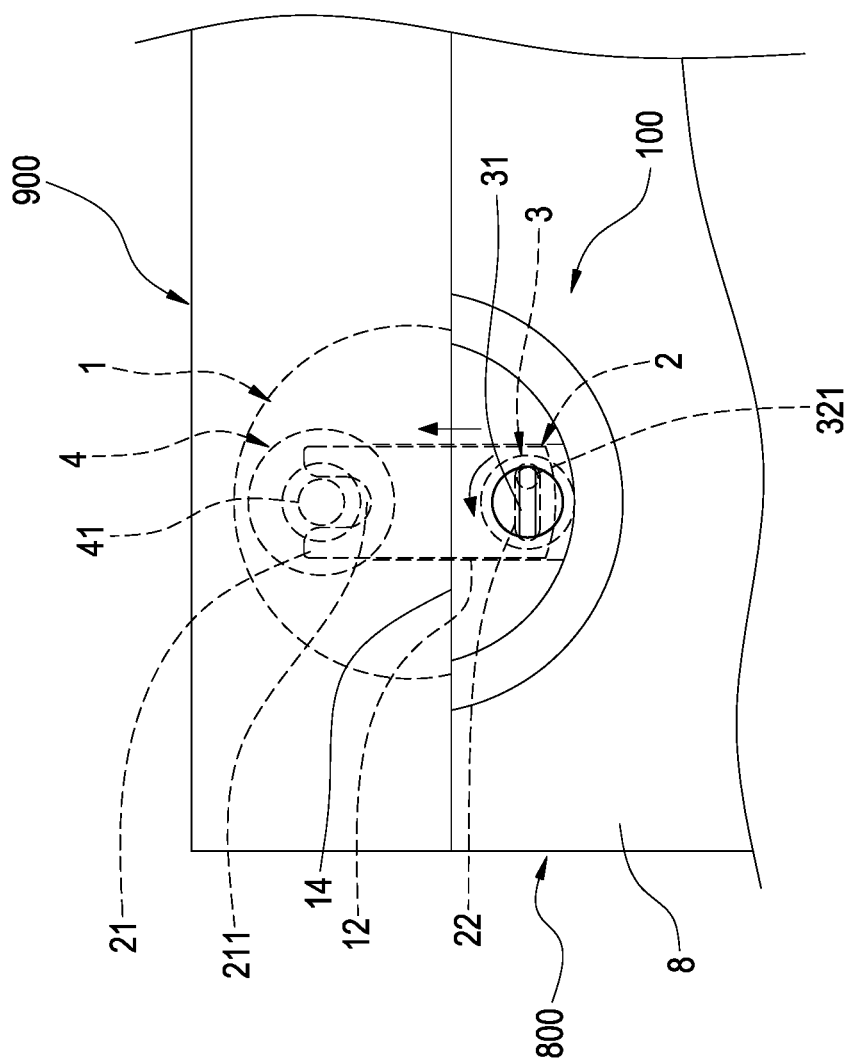
FIG. 5 is a top view according to FIG. 4 at an intermediate state of the assembly.
Figure 6:
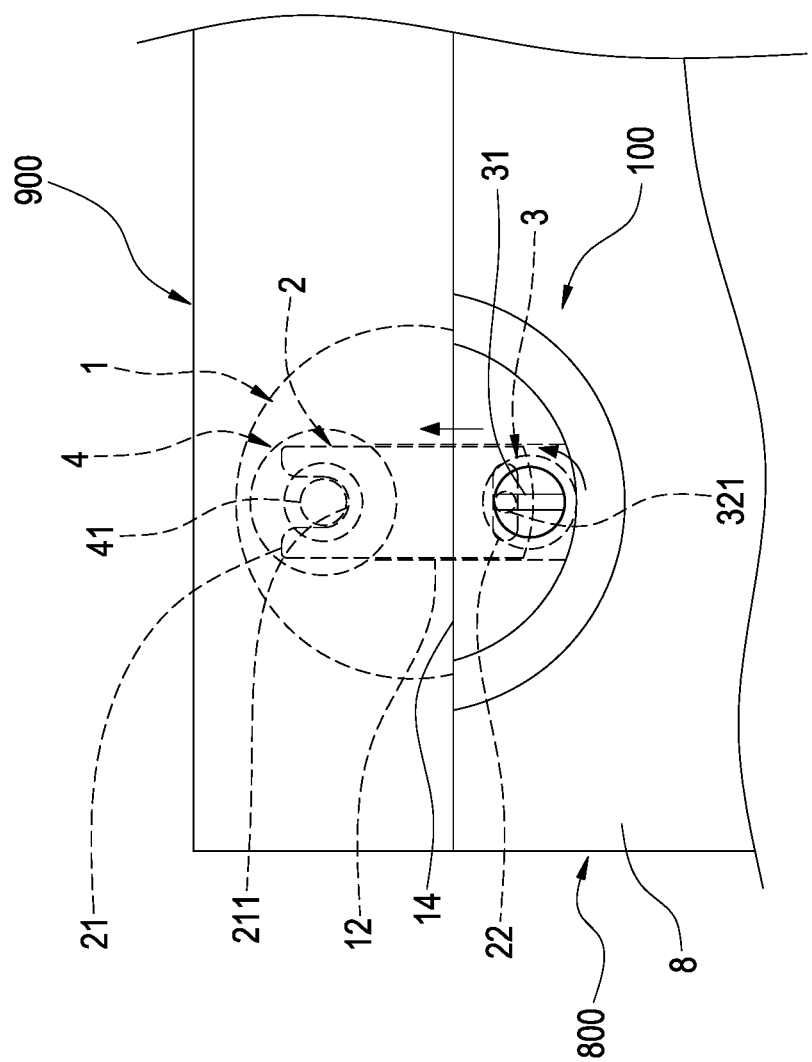
FIG. 6 is a top view according to FIG. 5 after assembly.
Figure 7:
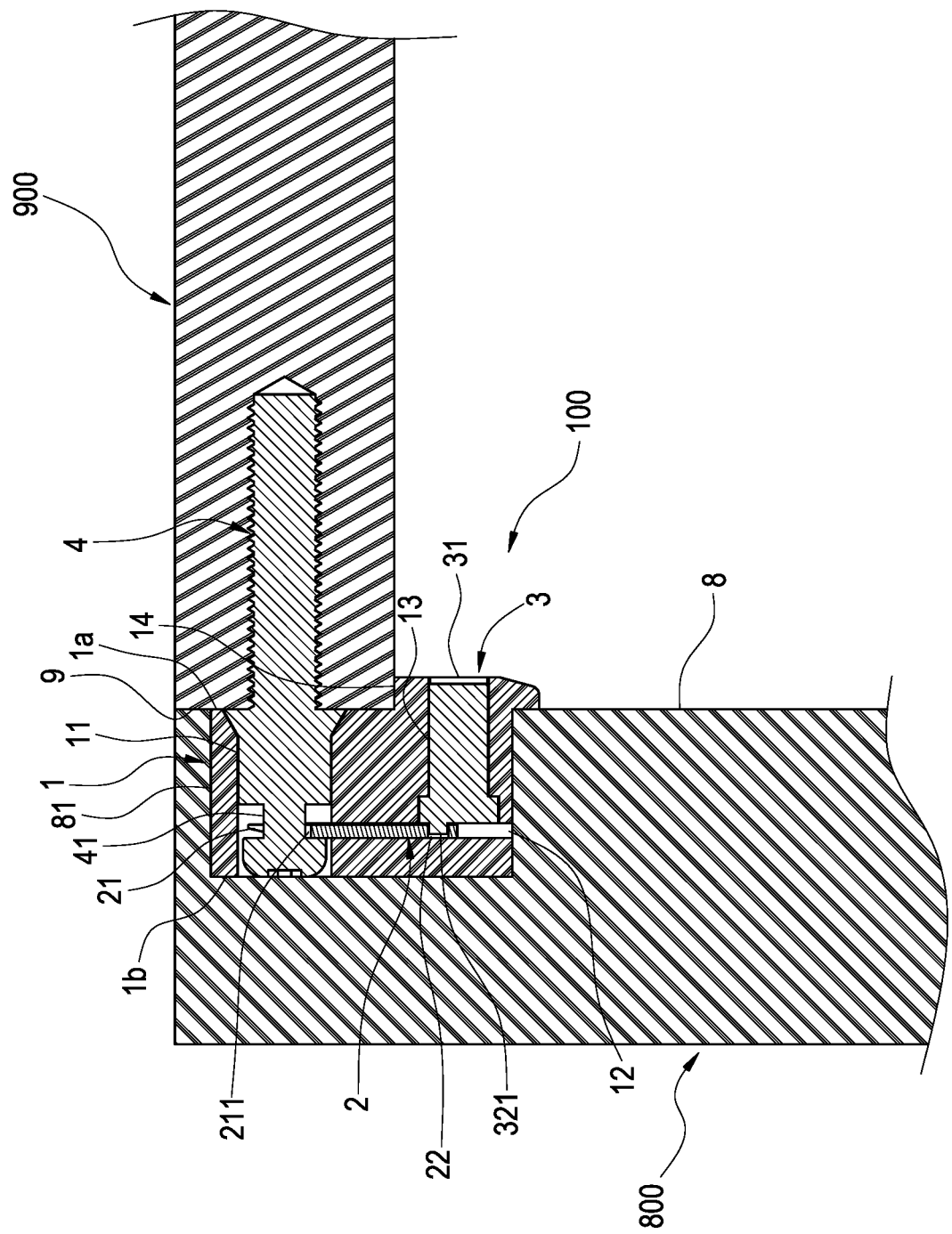
FIG. 7 is a cross-sectional view according to FIG. 6 after assembly.

Please refer to FIGS. 4-6 together with FIGS. 3 and 7. During the assembly process, the inserting part 4 is first inserted axially into and connected in the plug hole 11 such that the area of the joining side 9 corresponding to the plug opening 111 coves half of the first end surface 1a (refer to FIG. 3 or 1). Then, because the control end 31 is still exposed out of the other half of the first end surface 1a, the user can easily apply the hand tool to rotate the control part 3. In this way, the protrusion 321 eccentrically drives the latching part 2 to slide radially (toward the plug hole 11 as shown in FIG. 5). When the latching part 2 slides to the limit of the guide slot 12, the latching body 21 extends into the latching portion 41 to be latched (refer to FIG. 6). At this time, the inserting part 4 cannot be put out such that the joining side 9 of the second plate 900 is joined to the joining plane 8 of the first plate 800.

Conversely, during the disassembly process, only the control part 3 is reversed to eccentrically drive the latching part 2 to slide out reversely such that the latching body 21 is separated from the latching portion 41 to release the latching state. Then, the inserting part 4 can be removed reversely to detach the second plate 900 from the first plate 800.

Figure 2:
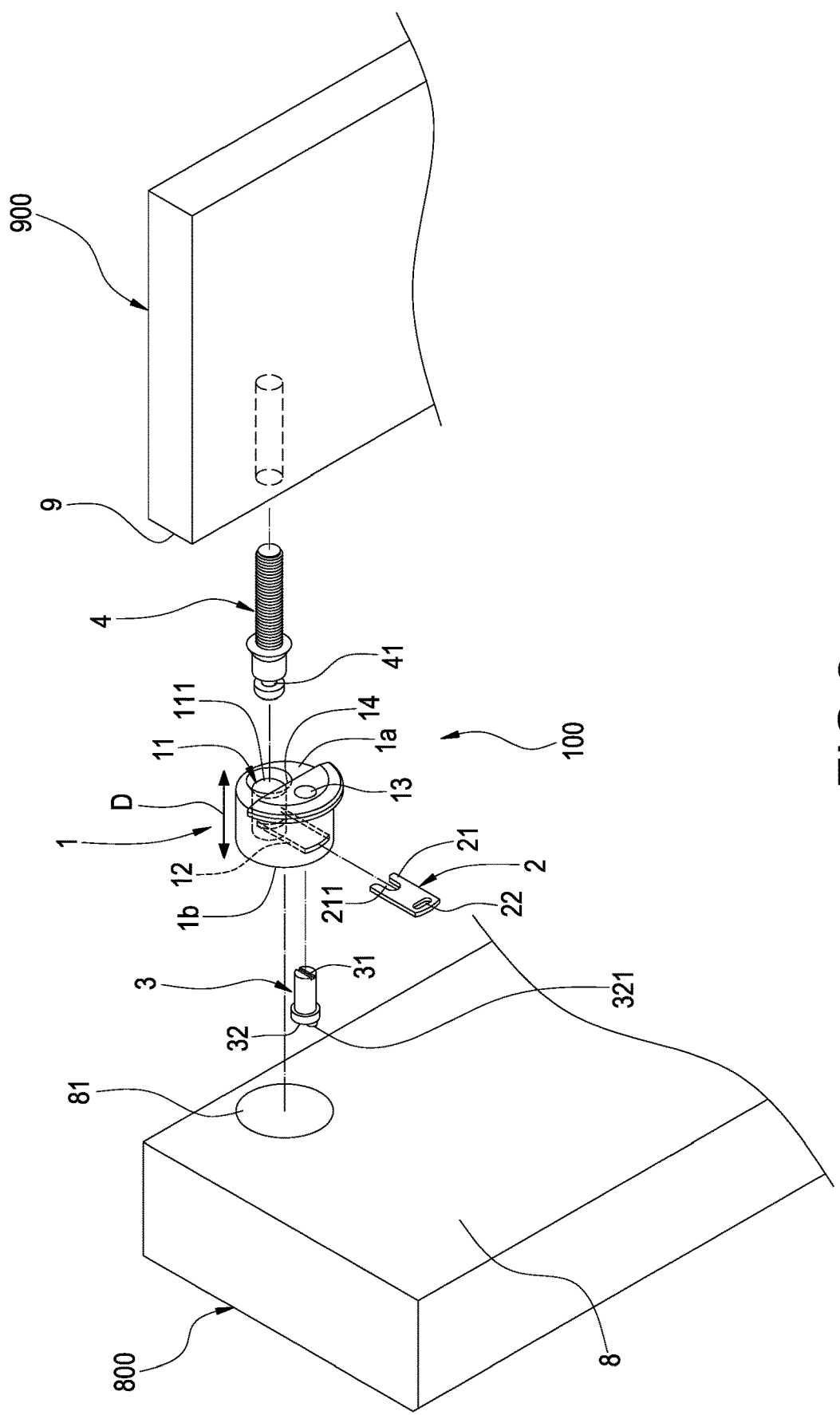
FIG. 2 is a perspective exploded view of the assembled apparatus of the present invention.

As shown in FIGS. 1-3, preferably, a supporting flange 14 further protrudes from the other half of the first end surface 1a of the body 1 to just carry and support the second plate 900, in the gravity direction, as the top plate to significantly enhance the structural strength of the assembled cabinet or case in which the supporting flange 14 protrudes from the first end surface 1a (refer to FIG. 3) and the control end 31 is further exposed out of the supporting flange 14.

Figure 8:
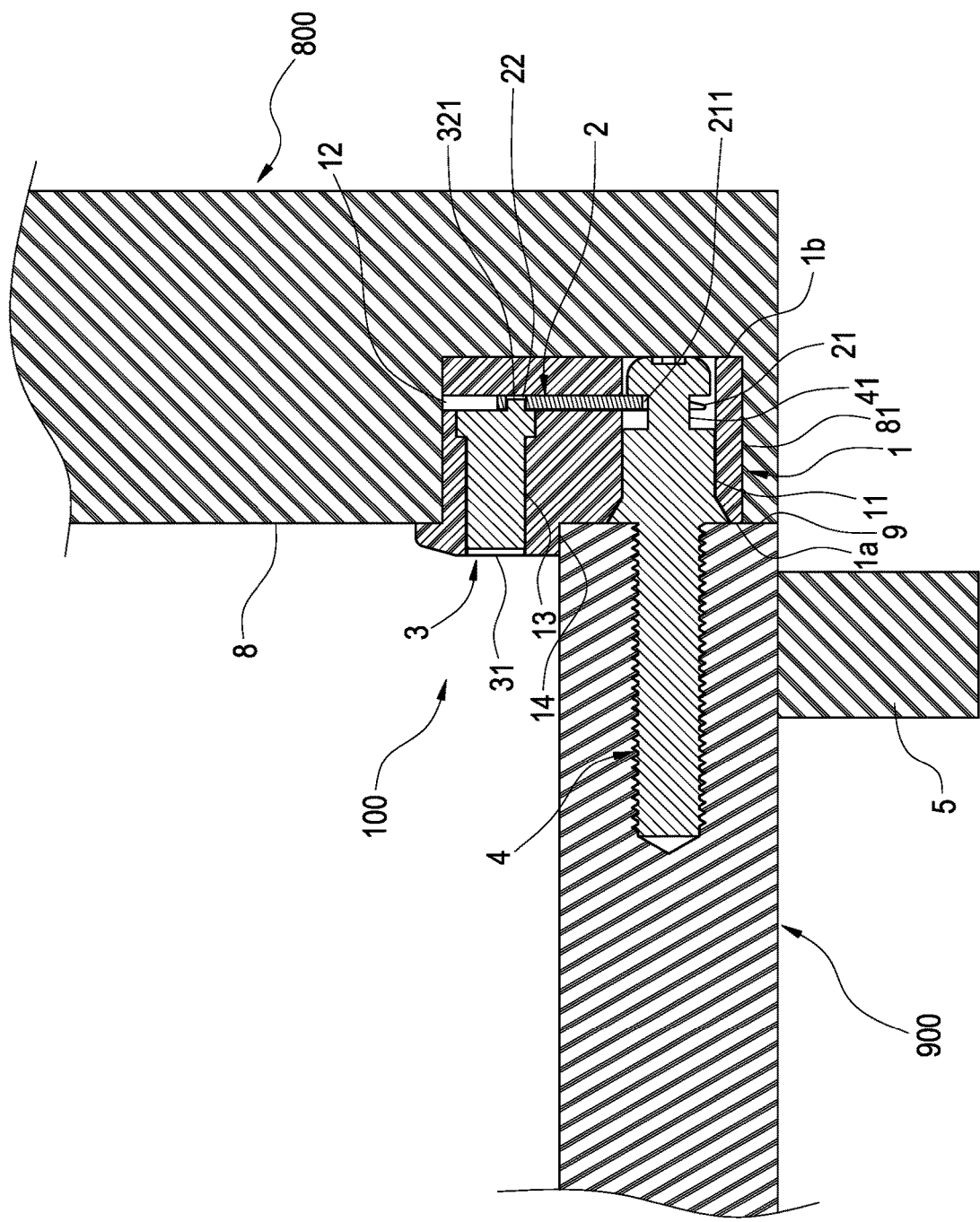
FIG. 8 is a cross-sectional view of the assembled apparatus of the present invention when inverted.

As shown in FIG. 8, the second plate 900 as the bottom plate is pressed against by means of the disposition of the supporting flange 14 in the anti-gravity direction. Because a foot 5 is disposed on the bottom side, not close to the edge, of the second plate 900 as the bottom plate, the first plate 800 is hung in the air. Further, the weight of the first plate 800 is applied to the top surface of the second plate 900 through the supporting flange 14. In other words, either the top plate or the bottom plate can be supported or pressed against by the supporting flange 14.

In summary, compared with the prior art, the present invention has the following effects. Only two holes are required for the first plate 800 and the second plate 900 to be assembled. That is, the buried hole 81 and the hole (not labeled) for the fixing of the inserting part 4. Also, the two holes are covered and hidden each other after the first plate 800 and the second plate 900 are closed joined together, which provides an esthetic appearance. The control part 3 in the shaft hole 13 rotates with respect to the body 1 instead of the rotation of the body 1 with respect to the buried hole 81; thus, the control part 3 used to control and release the latching state has the effect of a smooth and labor-saving rotation totally without being stuck in the inner wall of the shaft hole 13.

Moreover, the present invention has other effects. By means of the control part 3 eccentrically driving the latching part 2 to reciprocate along the guide slot 12, a high driving speed is achieved and the user rotates the hand tool for only a half turn to latch or unlatch, which is very fast and convenient for the assembly process. Also, only a small portion of the latching body 21 is required to achieve the latching and the unlatching and thus only a short course of reciprocation of the latching part 2 is needed to relatively decrease the inner diameter of the shaft hole 13 to the minimum size. In this way, the control end 31 exposed out of the first end surface 1a and the inner diameter of the shaft hole 13 can be decreased to the minimum sizes, which hardly affects the esthetic appearance. Through the supporting flange 14, the second plate 900 as the top plate or the bottom plate can be supported or be pressed against, which greatly enhances the structural strength of the assembled cabinet or case.

What is claimed is:

1. A connecting structure for assembly, comprising:
   a body having a plug hole and a guide slot disposed toward and leading to the plug hole;
   an inserting part detachably plugged into the plug hole correspondingly and having a latching portion;
   a latching part slidably connected to and guided by the guide slot, wherein the latching part has a latching body latched to the latching portion correspondingly; and
   a control part disposed movably in the body and selectively driving the latching part to reciprocate along the guide slot,
   wherein when the control part drives the latching part to slide toward the plug hole, the latching body is latched to the latching portion correspondingly, wherein when the control part drives the latching part to slide away from the plug hole, the latching body is separated from the latching portion to release a latching state of the latching portion and the latching body,
   wherein the inserting part is a rod body and the latching portion is a neck portion formed at an end of the rod body, wherein the latching part is a tongue sheet and the latching body is at least one projecting ear which is formed at an end of the tongue sheet and extends into the neck portion correspondingly.

2. The connecting structure for assembly according to claim 1, wherein the guide slot intersects with the plug hole.

3. The connecting structure for assembly according to claim 1, wherein the body defines an axial direction along which the plug hole is formed in the body, wherein the guide slot is formed radially in the body, communicating with and intersecting with the plug hole.

4. The connecting structure for assembly according to claim 1, wherein the control part is a shaft and rotationally and axially connected to the body, wherein an end of the shaft eccentrically drives the latching part to reciprocate along the guide slot and the other end of the shaft is exposed out of the body to be controlled.

5. The connecting structure for assembly according to claim 1, wherein the body has a first end surface and defines an axial direction perpendicular to the first end surface, wherein the plug hole is formed along the axial direction in the body and forms a plug opening exposed on the first end surface, wherein the control part is axially connected to the body along the axial direction and has a control end exposed out of the first end surface, wherein the guide slot is radially formed in the body and connects between the plug hole and the control part.

6. The connecting structure for assembly according to claim 5, wherein the body further has a supporting flange protruding from the first end surface, wherein the control end is exposed out of the supporting flange.

7. An assembled apparatus using a connecting structure for assembly, comprising:
   a first plate having a joining plane;
   a second plate having a joining side disposed adjacent to the joining plane; and
   a connecting structure comprising:
   a body embedded in the joining plane and having a plug hole and a guide slot disposed toward and leading to the plug hole;
   an inserting part fixed on the joining side, detachably plugged into the plug hole correspondingly, and having a latching portion;
   a latching part slidably connected to and guided by the guide slot, wherein the latching part has a latching body latched to the latching portion correspondingly; and
   a control part disposed movably in the body and selectively driving the latching part to reciprocate along the guide slot,
   wherein when the control part drives the latching part to slide toward the plug hole, the latching body is latched to the latching portion correspondingly to join the second plate to the first plate, wherein when the control part drives the latching part to slide away from the plug hole, the latching body is separated from the latching portion to release a latching state of the latching portion and the latching body,
   wherein the inserting part is a rod body and the latching portion is a neck portion formed at an end of the rod body, wherein the latching part is a tongue sheet and the latching body is at least one projecting ear which is formed at an end of the tongue sheet and extends into and latches the neck portion correspondingly.

8. The assembled apparatus using a connecting structure for assembly according to claim 7, wherein the body has a first end surface and defines an axial direction perpendicular to the first end surface, wherein the plug hole is formed along the axial direction in the body and forms a plug opening exposed on the first end surface, wherein the control part is axially connected to the body along the axial direction and has a control end exposed out of the first end surface, wherein the guide slot is radially formed in the body and connects between the plug hole and the control part.

9. The assembled apparatus using a connecting structure for assembly according to claim 8, wherein the body further has a supporting flange protruding from the first end surface and protruding out of the joining plane, wherein the supporting flange supports the second plate in the gravity direction or presses against the second plate in the antigravity direction, wherein the control end is exposed out of the supporting flange.

10. The assembled apparatus using a connecting structure for assembly according to claim 7, wherein the guide slot intersects with the plug hole.

11. The assembled apparatus using a connecting structure for assembly according to claim 7, wherein the body defines an axial direction along which the plug hole is formed in the body, wherein the guide slot is formed radially in the body, communicating with and intersecting with the plug hole.

12. The assembled apparatus using a connecting structure for assembly according to claim 7, wherein the control part is a shaft and rotationally and axially connected to the body, wherein an end of the shaft eccentrically drives the latching part to reciprocate along the guide slot and the other end of the shaft is exposed out of the body to be controlled.

\* \* \* \* \*